Feb. 5, 1929.

G. MINELLI 1,701,417

MOTOR VEHICLE SEAT

Filed June 21, 1927

INVENTOR.
G. Minelli.
BY
Bryant & Lowry
ATTORNEYS

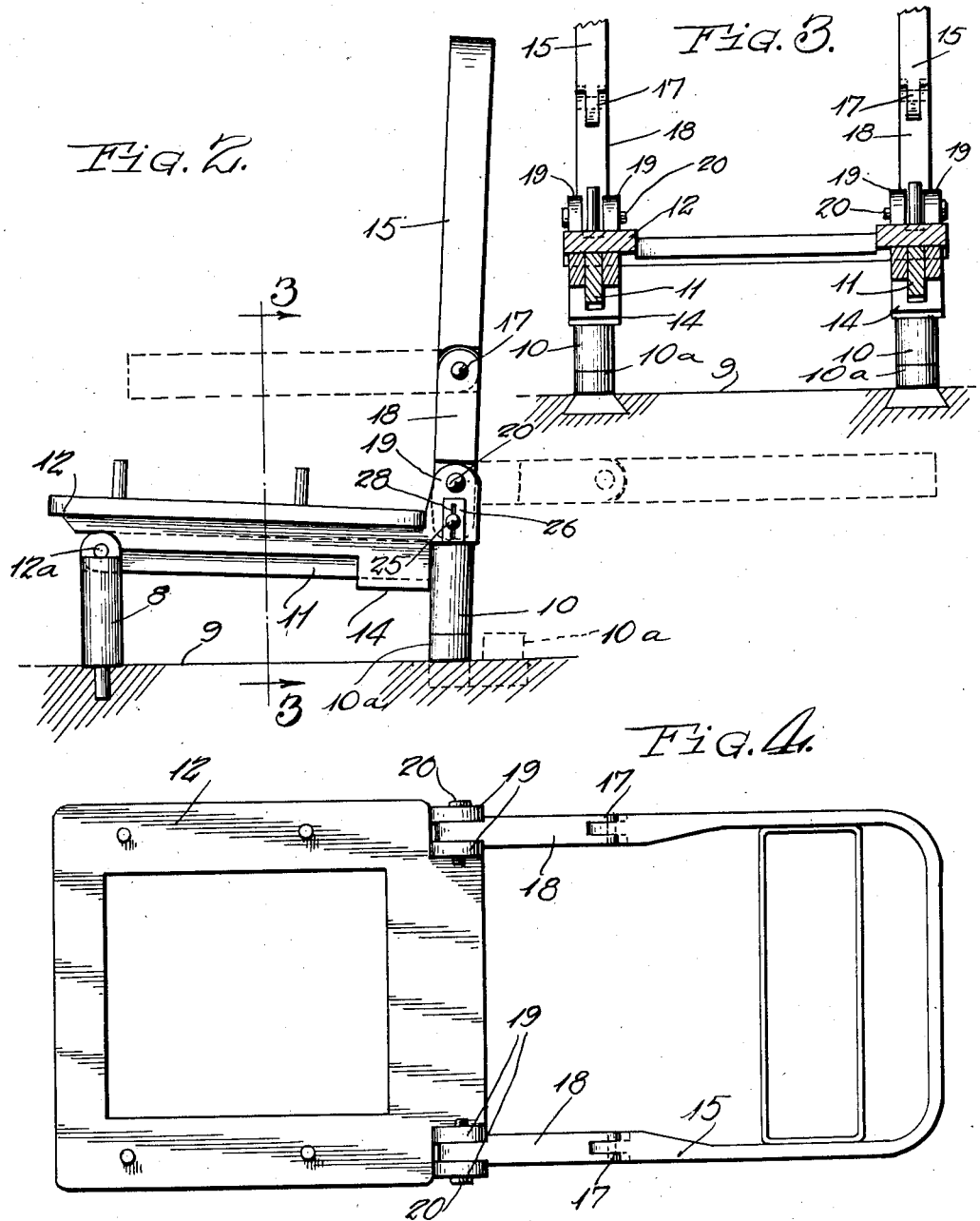

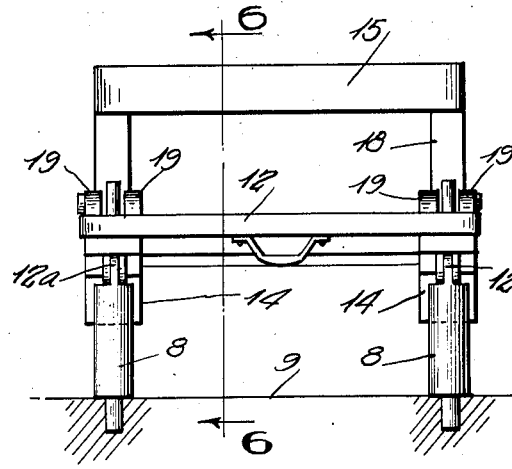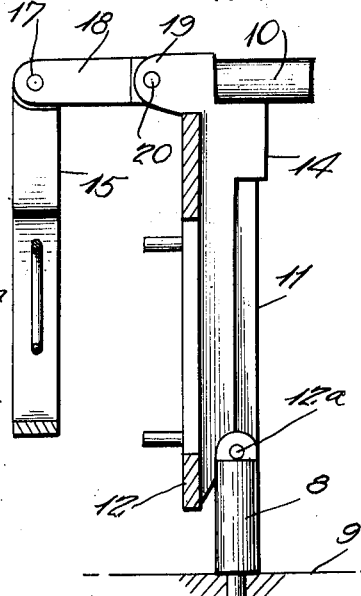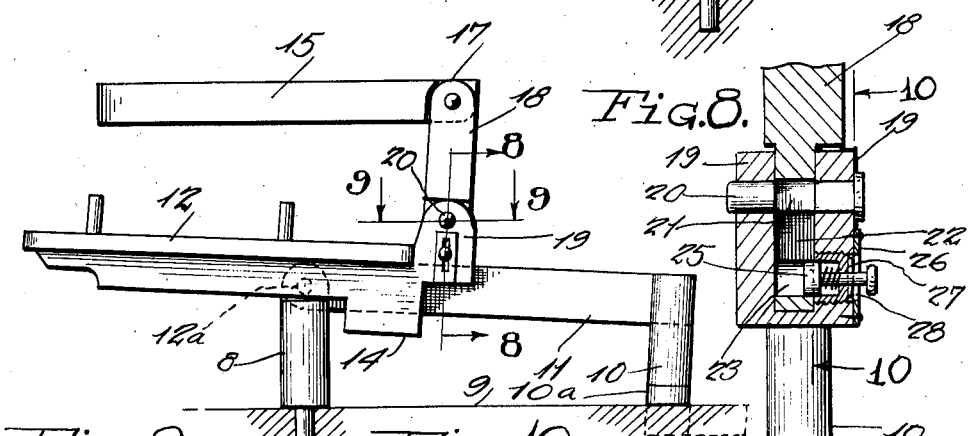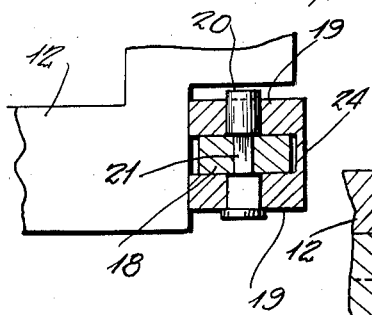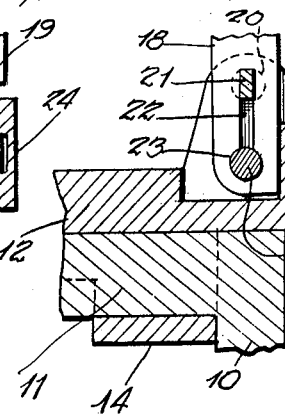

Patented Feb. 5, 1929.

1,701,417

UNITED STATES PATENT OFFICE.

GIUSEPPI MINELLI, OF DAWSON, NEW MEXICO.

MOTOR-VEHICLE SEAT.

Application filed June 21, 1927. Serial No. 200,371.

This invention relates to improvements in seats for motor vehicles, and has more particular reference to an improved form of folding and shiftable seat of that type, commonly employed as a front seat of motor vehicles of the coach type.

It is well known that the front seat of motor vehicles having bodies of the coach type are pivotally mounted so that they may be swung or shifted forwardly to an out of the way position for permitting persons to readily enter or pass out of the body through the front door of the latter, the seat having a hinged back rest adapted to be folded forwardly and downwardly prior to the shifting of the seat bodily.

Seats of the above kind heretofore devised are objectionable in that the occupants thereof must leave the seat before they can be folded and shifted in order to permit the occupants of the rear seat to leave the vehicle or persons to enter the vehicle for access to the rear seat.

It is accordingly an object of the present invention to provide a front motor vehicle seat of the above kind which may be bodily shifted forwardly without folding the back rest or necessitating the passenger of the front seat leaving it, at the same time providing sufficient clearance for the entrance and exit of the rear seat passengers.

A still further object is to provide a shifting seat of the above kind in which the usual folding and forward shifting of the seat may be had for obtaining maximum clearance when the passenger of the front seat does not desire to remain in his position upon the seat. A still further object is to provide a folding and shifting motor vehicle seat of the above kind in which simple and effective provision is made for prermitting shifting of the back rest rearwardly and downwardly to a substantially horizontal position for spanning the space between the seat cushions of the front and rear seats to form a bed bottom.

Still another object is to provide simple and efficient means for releasably preventing the rearward and downward shifting of the front seat back rest when operatively disposed.

Still another object is to provide a seat characterized as above which is of generally simplified and improved construction.

Other objects will appear as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views, Figure 1 is a view partly in side elevation and partly broken away and in longitudinal section of a motor vehicle of the coach type equipped with front seats constructed in accordance with the present invention;

Figure 2 is a side elevational view of the front seat shown in Figure 1 with the seat and back rest cushions removed and folded positions of the back rest indicated by dotted lines;

Figure 3 is a vertical section taken substantially upon line 3—3 of Figure 2;

Figure 4 is a top plan view of the device shown in Figure 2 with the back rest in its rearwardly and downwardly swung adjusted position;

Figure 5 is a front elevational view of the device shown in Figure 2 with the upper hinged section of the back rest in forwardly swung or folded position;

Figure 6 is a view partly in elevation and partly in longitudinal section of the seat shown in Figure 2 in folded and forwardly swung shifted position;

Figure 7 is a side elevational view of the seat in the position shown in Figure 5 slidably shifted forwardly;

Figure 8 is an enlarged fragmentary section substantially upon line 8—8 of Figure 7;

Figure 9 is an enlarged fragmentary horizontal section taken upon line 9—9 of Figure 7;

Figure 10 is a vertical section taken substantially upon line 10—10 of Figure 8; and Figure 11 is a still further enlarged fragmentary detail view of a portion of the structure shown in Figure 8.

Figure 1:
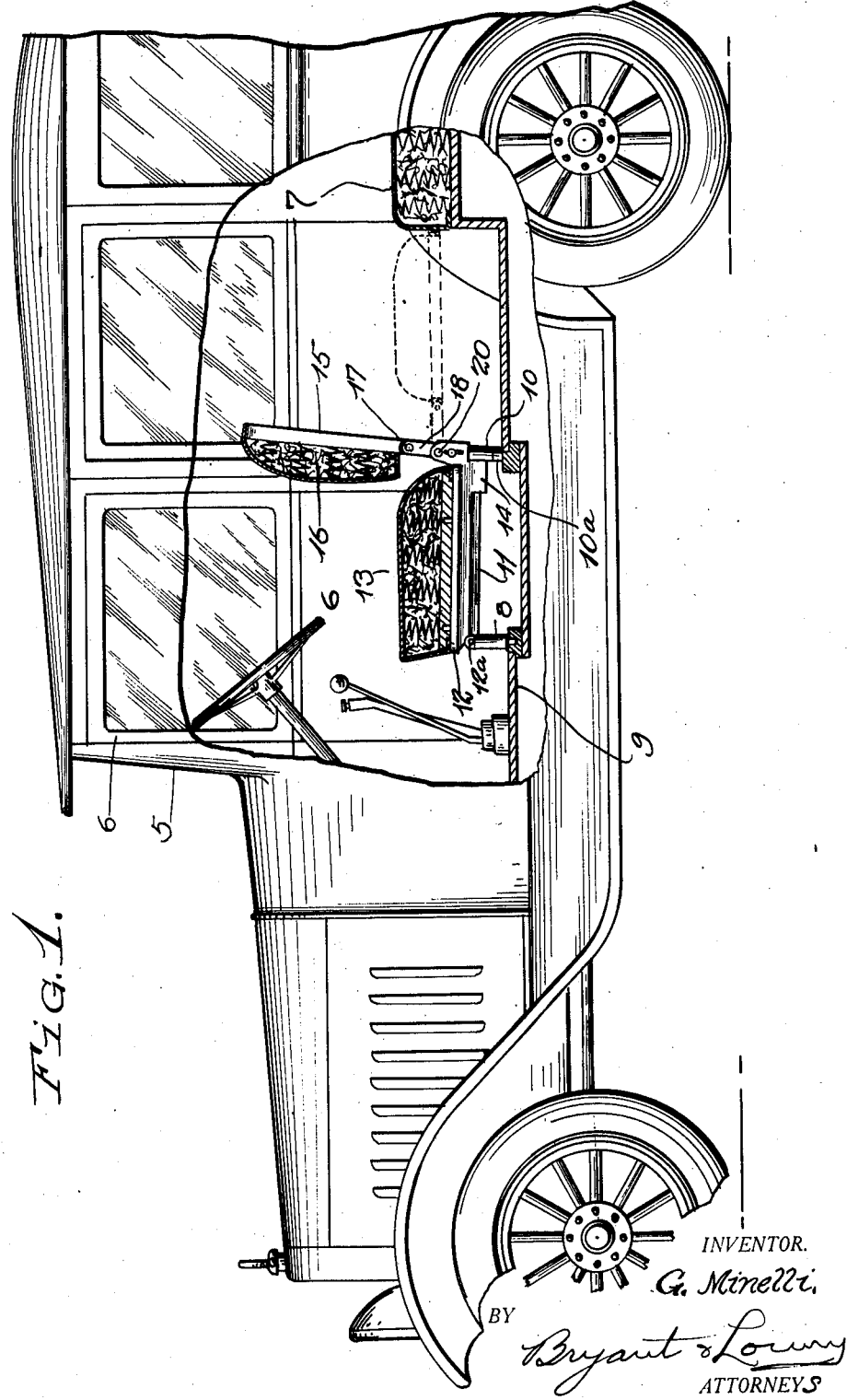

Referring more in detail to the drawings, 5 indicates the motor vehicle body which is of the usual coach type provided with only front entrance and exit doors beside the front seat as at 6, the usual rear seat having a removable seat cushion 7 and being provided behind and in spaced relation to the front seats as shown. Two front seats are employed in side by side relation as is well known in the art, but as the construction of both seats is alike, specific description of one will suffice for both.

As shown, each front seat comprises a supporting base including a pair of front supporting legs 8 suitably fixed at their lower ends in the floor 9 of the vehicle body, and a pair of rear supporting legs 10 resting upon said floor as shown. Each front leg is connected with the rear leg at the same side of the seat by means of a side guide rail 11, the rear end of which is rigid with the associated rear leg 10 and the forward end of which is hinged to the upper end of the associated front leg 8 as at 12$^a$, whereby the major portion of the seat may be swung upwardly and forwardly to a vertical out of the way position as shown in Figure 6 so that passengers may readily enter or pass out of the vehicle body 5 through the doors 6.

The present seat further embodies a suitable rigid rectangular frame or seat bottom 12 upon which is adapted to be placed a removable seat cushion 13. The seat bottom 12 is provided at the rear thereof with side depending slides 14 which slidably embrace the guide bars or rods 11 and normally engage the front sides of the upper ends of the rear legs 10 to limit the rearward sliding movement of the seat bottom to a normal operative position as shown in Figure 2. A back rest frame 15 is carried by the rear end of the seat bottom frame 12 and may be provided with a conventional form of back rest cushion or pad as at 16. It is thus apparent that the seat bottom and the back rest may be readily slid forwardly by movement of the slides 14 along the guide bars 11, to thereby provide sufficient clearance for the entrance and exit of passengers occupying or desiring to occupy the back seat of the vehicle, without requiring the occupants of the front seats leaving the latter.

It will be understood that maximum clearance is had when the front seat is folded and swung forwardly out of the way, and it is accordingly desirable to do this when convenient. For this purpose, the back rest frame 15 is preferably composed of hingedly connected sections embodying a major upper section capable of being swung forwardly and downwardly to a horizontal position as indicated in Figures 2, 5 and 7, adjacent the seat cushion 13, whereby the subsequent forward and upward swinging of the guide bars 11 and parts carried thereby as shown in Figure 6, may be had. The back rest frame 15 is preferably of U-shape with the legs thereof jointed near their lower ends by rule hinge joints as at 17, whereby the upper section may be swung forwardly and downwardly as mentioned above. The lower sections of the legs of the back rest frame 15 are indicated at 18, and the rule joints 17 naturally limit the upward and rearward swinging movement of the upper section of said frame to a point wherein the leg sections are longitudinally aligned and the back rest is in its operative substantially vertical position as shown in Figures 1 and 2. In view of the above it will be seen that the present seat may be simply shifted forwardly or folded and swung upwardly and forwardly, as found most convenient or desirable, for permitting the entrance and exit of rear seat passengers.

The lower ends of the lower leg sections 18 of the back rest frame 15 are adjustably pivoted to the rear of the seat bottom frame 12 in order to permit positioning of the front seat back rest in rearwardly and downwardly swung horizontal position as shown by dotted lines in Figure 1, so as to span the space between the seat cushions of the front and rear seats and thereby form a comfortable bed bottom for reclining purposes. As shown, the seat bottom frame 12 is provided at its rear corners with pairs of upstanding ears 19 between which the reduced lower ends of the leg sections 18 are loosely disposed. Extending transversely through each pair of ears 19 is a non-rotatable pin 20 having an intermediate reduced flat portion 21 exposed between the pair of ears and slidably fitting a longitudinal elongated slot 22 provided in the reduced lower end portion of the associated leg section 18 whereby the latter is slidably connected to the seat frame 12. The lower end of the slot terminates in a circular enlargement as at 23 of a diameter corresponding to the major dimension of the flat portion 21 whereby when the back rest frame is lifted to position the pin portion 21 within the circular terminal 23 of the slot 22, the back rest is free to be swung about the pin 20 so as to move rearwardly and downwardly to the horizontal position of Figure 1, the rearward and downward swinging movement of the back rest being suitably limited by a stop web 24 connecting the rear edge portions of the ears 19 and adapted to have the leg sections 18 rest thereon rearwardly of and below the pin 20. With the leg sections 18 resting upon the stop 24 the downward movement of the back rest is limited to the desired horizontal position.

By swinging the back rest upwardly to its normal operative position, the flat portion 21 of the pin 20 may enter the slot 22 when the back rest is lowered, and said back rest is then effectively retained in its vertical operative position for use as a back rest, and in order to prevent accidental lifting and swinging movement of the back rest, means is provided to releasably restrain the leg sections 18 against upward displacement on the pins 20. As shown, the outer ear 19 of each pair is provided with a transversely disposed spring pressed latch bolt 25 disposed and urged to normally enter the circular terminal 23 of the slot 22 in the adjacent leg section 18 as shown in Figures 10 and 11. Obviously, with the latch bolt 25 engaged in the terminal 23 of the slot 22 of each leg section 18, the back rest will be effectively held in lowered position, and the back rest will be retained in an effective manner in its upright position. When it is desired to swing the back rest rearwardly and downwardly it is simply necessary to release the latch bolts 25 by pulling outwardly upon the latter until they entirely pass out of the circular terminals 23. In order to retain the latch bolts 25 released or retracted, a face plate 26 is provided upon the outer surface of each outer ear 19 through which the stem of the associated bolt 25 slidably moves, said base plate being provided with an elongated slot extending to opposite sides of the stem of bolt 25 through which a cross pin 27 of said latch bolt stem may pass when aligned with the slot. Said slot of the face plate is indicated at 28, and it is obvious that when the cross pin 22 passes outwardly through the slot 28, the latch bolt may be given a quarter turn and released, whereupon the pin 27 will engage the outer face of the plate 26 and retain the associated latch bolt 25 in retracted or released position. By turning the latch bolt until the pin 26 aligns with the slot 28, said pin may pass inwardly through said slot to permit the latch bolt to return to latching position, in an obvious manner.

The blocks 10ª are mounted in or on the floor 9 for longitudinal sliding movement so that when said blocks are disposed in forwardly slid position the rear legs 10 will rest thereon to hold the rear end of the front seat raised with its cushion 13 horizontally disposed in alinement with the rear seat cushion 7. Thus, when the back rest of the front seat is lowered to the dotted line position of Figure 1, a flat bed bottom will be formed. By sliding the blocks 10ª rearwardly to the dotted line position of Figure 2, the rear end of the front seat may be lowered until the legs 10 contact with the floor, thereby positioning the front seat cushion 13 at a rearward inclination to afford a most comfortable sitting posture when the back rest of the front seat is raised. As shown, the blocks 10ª have dove-tailed lower ends slidably fitted in dove-tailed grooves provided in the floor.

From the foregoing description it is believed that the construction and operation as well as the advantages of the present invention will be readily understood and appreciated by those skilled in the art.

Minor changes may be made without departing from the spirit and scope of the invention as claimed.

What I claim as new is:—

1. A front seat for motor vehicle bodies of the coach type comprising a supporting base hingedly mounted for upward and forward swinging movement, a seat bottom frame slidably mounted on the supporting base for free forward shifting from normal operative position, and a forwardly and downwardly foldable back rest carried by said seat bottom frame, said back rest being adjustably hinged to the seat bottom frame to permit forward and downward folding without disturbance of the seat frame and to permit rearward and downward swinging thereof to a horizontal position to span the space between and cooperate with the seat cushions of the front and rear seats of the vehicle body to form a bed bottom, said back rest having upper and lower leg sections hinged together by rule joints to permit the folding, the adjustable hinge connections being between the lower ends of the lower leg sections of said back rest frame and said seat bottom frame.

2. A front seat for motor vehicle bodies of the coach type comprising a supporting base, a seat bottom frame mounted on the supporting base, and a forwardly and downwardly foldable back rest carried by said seat bottom frame, said back rest being adjustably hinged to the seat bottom frame to permit rearward and downward swinging thereof to a horizontal position to span the space between and cooperate with the seat cushions of the front and rear seats of the vehicle body to form a bed bottom, said back rest frame having upper and lower leg sections hinged together by rule joints to permit the folding, the adjustable hinge connections being between the lower ends of the lower leg sections of said back rest frame and said seat bottom frame, said lower leg sections of the back rest frame being pivotally and slidably connected to said seat bottom frame to provide said adjustable hinge connections.

In testimony whereof I affix my signature.

GIUSEPPI MINELLI.